United States Patent [19]
London et al.

[11] Patent Number: 5,103,452
[45] Date of Patent: Apr. 7, 1992

[54] X-RAY LASER SYSTEM, X-RAY LASER AND METHOD

[75] Inventors: Richard A. London, Oakland; Mordecai D. Rosen, Berkeley, both of Calif.; Moshe Strauss, Omer, Israel

[73] Assignee: The United States of America as represented by the United States Department of Energy, Washington, D.C.

[21] Appl. No.: 647,075

[22] Filed: Jan. 29, 1991

[51] Int. Cl.$^5$ ............................................. H01S 3/30
[52] U.S. Cl. .................................... 372/5; 372/1; 372/7; 372/39; 372/66
[58] Field of Search ................... 372/5, 7, 1, 66, 39

[56] References Cited

U.S. PATENT DOCUMENTS

| | | | |
|---|---|---|---|
| 4,589,113 | 5/1986 | Hagelstein | 372/5 |
| 4,827,479 | 5/1989 | Campbell et al. | 372/5 |

Primary Examiner—Georgia Epps
Attorney, Agent, or Firm—Henry P. Sartorio; Miguel A. Valdes; William R. Moser

[57] ABSTRACT

Disclosed is an x-ray laser system comprising a laser containing generating means for emitting short wave length radiation, and means external to said laser for energizing said generating means, wherein when the laser is in an operative mode emitting radiation, the radiation has a transverse coherence length to width ratio of from about 0.05 to 1. Also disclosed is a method of adjusting the parameters of the laser to achieve the desired coherence length to laser width ratio.

17 Claims, 1 Drawing Sheet

X-RAY LASER SYSTEM, X-RAY LASER AND METHOD

The United States Government has rights in this invention pursuant to Contract No. W-7405-ENG-48 between the United States Department of Energy and the University of California for the operation of Lawrence Livermore National Laboratory.

BACKGROUND OF THE INVENTION

Field of the Invention

This invention relates to a laser system and laser having improved transverse coherence and to a method of achieving the improved coherence.

More particularly, it relates to an x-ray laser system and laser having improved transverse coherence which is suitable for use in obtaining improved x-ray holographic images.

X-ray laser systems and lasers have been known in the art since about 1984. X-ray lasers are similar to visible light lasers except that they generate x-rays when properly stimulated, or pumped, instead of conventional beams of light. The total "x-ray" region broadly covers 700 Å down to 0.1 Å wavelength. Traditionally, however, the x-ray range is considered to begin at about 300 Å. The x-ray region is further categorized as "soft" for wavelengths in the ~2–300 Å range and "hard" for shorter wavelengths. X-ray lasers can be used for a number of purposes, including the making of holographic images.

Laser irradiated exploding foils have recently been used to create soft x-ray lasers. When properly designed and irradiated, such foils give rise to elongated plasmas that have high density, nearly constant temperature and smooth transverse density profiles. Models for laser heated exploded foils, wires or fibers and spheres are described in a number of articles, including J. M. Dawson, Phys. Fluids 7, 981 (1964); W. J. Fader, Phys. Fluids 11, 2200 (1968); J. Dawson et al., Phys. Fluids, 12, 8757 (1969); R. E. Kidder, in Physics of High Energy Density (Academic, New York, 1971), p. 306; A. V. Farnsworth, Phys. Fluids 23, 1496 (1980), Rosen et al., Phys. Rev. Letters, 4,106 (1985), and R. A. London and M. D. Rosen, Phys. Fluids 29, 3813 (1986).

Discussions of the feasibility and ultimate utility of x-ray holography of biological samples are given by Solem et al., "Microholography of Living Organisms," Science, 218,229-2357 (1982), M. Howells, "Fundamentals Limits in X-ray Holography," in X-Ray Microscopy II, D. Sayre et al., Eds, (Springer Verlag, New York, 1988) p. 263, and R. A. London, M. D. Rosen and J. E. Trebes, Appl. Optics, 28, 3397 (1989).

X-ray lasers which are to be used for holography, however, require highly coherent wave output. The degree of longitudinal coherence is generally adequate for holographic applications, but the transverse coherence of prior art lasers is generally inadequate to generate high resolution images. Coherence, as used herein, refers to the existence of a correlation between the phases of two or more waves, such as the reference wave and the object wave in the holographic process.

In a normal optical laser, coherence is achieved by operating the laser in a multi-pass cavity. Because the reflectivity of x-ray mirrors is low, (less than about 50%) and the duration of x-ray laser gain is short (of order 250 psec), x-ray lasers have been operated as single pass or few pass (up to three) devices. It has therefore been difficult to design one with good transverse coherence.

Previous methods suggested for improving the transverse coherence involve using a lasing medium with a small cross-sectional area (see Rosen, Trebes and Matthews, "A Strategy for Achieving Spatially Coherent Output from Laboratory X-ray Lasers," Comments in Plasma Physics and Controlled Fusion, Vol. 10 p. 245, (1987)). The method suggested by Rosen et al., appears to be somewhat difficult to implement since it requires a two-component exploding foil—a lasant material surrounded by a non-lasant material, and furthermore, the lasant needs to be initially very thin (=80 Å in their example).

It would be desirable in the art to provide a laser and laser systems having improved transverse coherence, and a method of achieving improved coherence in an X-ray laser.

SUMMARY OF THE INVENTION

It is an object of this invention to provide an x-ray laser system containing an x-ray laser having improved transverse coherence in the wave output thereof.

It is a further object of this invention to provide an x-ray laser system containing an x-ray laser, the output of which has transverse coherence sufficient for it to be used to generate holographic images.

It is a still further object of this invention to provide a method of improving the transverse coherence of the output of an x-ray laser system and laser.

Other objects and advantages of the invention will be apparent from the description and drawings to follow.

The objects of the invention are achieved by creating a x-ray laser system which utilizes a lasing medium having a specific class of transverse profiles of gain and/or refractive index. These profiles create gain-guiding and/or refractive anti-guiding, respectively, of the x-rays as they travel down the length of the laser and are amplified. The essential features of these profiles are that they be smooth and curved near the central axis of the laser, and that the gain is at a maximum on axis and the index of refraction is at a minimum on axis. Either gain-guiding or refractive index anti-guiding or a combination of the two effects can be used to create a coherent x-ray laser.

The laser system of this invention therefore comprises:
a. a laser containing generating means for emitting short wave length radiation, and
b. means external to said laser for pumping said generating means, wherein when in an operative mode emitting radiation, the radiation has a coherence length to width ratio of from about 0.5 to about 1.

In one aspect, the method of the invention is one for improving the transverse coherence of radiation being emitted from an x-ray laser system containing an x-ray laser which comprises: adjusting the design parameters of the laser so as to conform to the formula $$a \leq 0.2(g\lambda)^{\frac{1}{2}} L$$

wherein all values are in cgs units, and a is equivalent to the full width half maximum of said laser, L is the length of said laser, g is equivalent to the maximum on axis value of the gain coefficient of said laser and $\lambda$ is the wavelength of said laser.

In another aspect, the invention is a method of improving the transverse coherence of radiation being emitted from an x-ray laser which comprises: adjusting the design parameters of the laser so as to conform to the formula:

$$a \leq \eta(gL)^2/[\ln(4\eta)]^{\frac{1}{2}}$$

in which $$\eta = \frac{N_e}{g} \cdot \frac{2e^2\lambda}{M_e C^2} = 6 \cdot 10^{-13} \frac{\lambda N_e}{g}$$

wherein all values are in cgs units, and a is equal to the full width half maximum of said laser, L is the length of said laser, g is the maximum on axis value of the gain coefficient, $\lambda$ is the wavelength of said laser, $N_e$ is the maximum on axis electron density, e is the electron charge, $M_e$ is the electron mass and C is the speed of light.

In the foregoing, the first method described utilizes pure gain guiding to achieve improved transverse coherence; while the second method utilizes gain guiding and refractive index anti-guiding, wherein refraction is caused by transverse gradients in the election density.

In yet another aspect the invention comprises a method of improving the transverse coherence of radiation being emitted from an x-ray laser which comprises adjusting the design parameters of the laser so that the ratio of the coherence length to width of the laser ranges from about 0.05 to about 1.

DETAILED DESCRIPTION OF THE INVENTION

Figure 1:
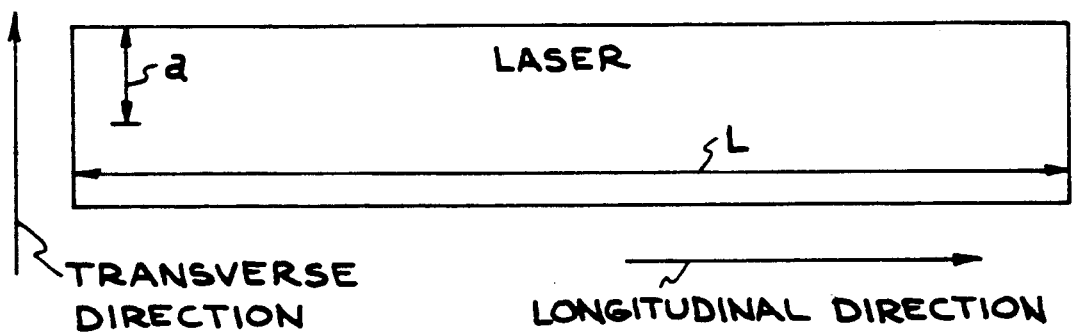
FIG. 1 is a schematic of X-ray laser showing transverse and longitudinal directions and width and length.

For various applications, an x-ray laser may be required to have several of the following properties: high energy, high power, efficiency, short wavelength, short time duration, monochromaticity, and coherence. This invention provides a means to establish a high degree of transverse coherence of an x-ray laser can be substantially improved by adjustment of the design parameters of the laser in accordance with certain mathematical formulas which have been developed and are described more fully below. While the invention, in general, may be applied to any x-ray laser, it is particularly adapted to a laser system containing an exploding foil x-ray laser such as is described in articles by M. D. Rosen et al. entitled "Exploding Foil Technique for Achieving a soft X-ray Laser", Phys. Rev. Lett., 54, 106 (1985), R. A. London and M. D. Rosen, entitled "Hydrodynamics of Exploding Foil X-Ray Lasers," appearing in Phys. Fluids 29:(11), November 1986, pp. 3813-3822, and U.S. Pat. No. 4,827,479, all three of which are incorporated herein by reference.

A representative laser system comprises a selenium foil approximately 750 Å thick, attached to a formvar substrate approximately 1500 Å thick. This embodiment has employed two pulsed beams of line focused, optical laser radiation each having an energy flux of approximately $5 \times 10^{13}$ watts/cm$^2$, a wavelength of approximately 0.532 microns, and a full width at half maximum amplitude duration of approximately 450 picoseconds to pump the selenium foil. The line focused beams each illuminated generally rectangular portions of the selenium and formvar target that are approximately 1.1 cm long and approximately 0.02 cm wide.

Coherence is a property of light that determines how well light can be focused and how well interference experiments and measurements based on interference can be performed. Introductions to optical coherence may be found in several text books. There are two types of coherence: longitudinal (or temporal) and transverse (or spatial). Longitudinal coherence characterizes how well the phase of a wave is maintained over a distance in the propagation direction, while transverse coherence describes how the phase is maintained in the perpendicular direction.

The coherence requirements for x-ray holography using a 45 Å x-ray laser require the longitudinal coherence length to be larger than the path length difference between the object beam and the reference beam, estimated to be about 5 μm in a Fourier-transform holography system. The longitudinal coherence length is related to the line width by $L_l = \lambda^2/\Delta\lambda$, where $\lambda$ is the laser wavelength. Using the thermal Doppler width for an estimate, we get $L_l = 37$ μm. This estimate is supported by the observation of a sub-Doppler line profile of a neon-like selenium laser at 206 Å. The longitudinal coherence is therefore thought not to be a problem. The situation is more difficult for transverse coherence. The transverse coherence length must be larger than the extent of the sample, typically ≈10 μm, and a certain amount of energy must irradiate the sample to provide high signal-to-noise hologram. The desired coherence length is obtainable by using a pinhole in front of the laser or by placing the object far from the laser, however, the combined requirement of high energy and coherence is the difficulty, requiring efficient production of coherent radiation. The required coherent energy is estimated to range from 1 to 17 μJ for a 750- to 300 Å resolution hologram of a gold tagged sample and 1000 μJ for a 300 Å resolution hologram of an untagged sample of protein in water. An improvement in the coherence of the current lasers is called for to meet the transverse coherence requirements.

In mirrorless lasers, such as most x-ray lasers, a high degree of transverse coherence is more difficult to achieve than for usual lasers containing cavities with highly reflective mirrors. Transverse coherence is a property of a laser which describes how well correlated the output radiation is at various transverse (i.e. perpendicular to the laser beam) positions in the beam. If the radiation is well correlated, the electromagnetic wavefront will be smooth. A high degree of transverse coherence is a property which allows one to combine different parts of the beam (e.g. by passing the radiation through interference slits) and obtain a steady, high contrast interference pattern. It is thus very important for applications, such as holography, which rely on wave interference in order to make images, or other measurements. We utilize the concept of a transverse coherence length to describe the property of transverse coherence. The transverse coherence length is the distance over which a good correlation is maintained. For a beam of low or poor coherence, the transverse coherence length is small, while for a beam of high coherence, the transverse coherence length is large. The fraction of the width of the laser over which good correlation in the output is maintained is called the relative coherence length. The relative coherence length is defined, in other words, as the ratio of the transverse coherence length to the width of the laser. It describes the portion of a laser beam which is usable for interference experiments, such as holography. The greater the relative coherence length, the greater is the fraction of output radiation which is coherent and which is therefore usable for applications requiring coherence. It is the object of this invention to make the relative coherence length large—as close to unity as possible. We thus define good coherence for a laser as the property of having a large value of the relative coherence length (greater than 0.05, ideally approaching 1).

Previous methods to improve the coherence of x-ray lasers rely on making the laser very long and narrow (M. D. Rosen et al., "Strategy for Achieving Spatially Coherent Output from Laboratory X-Ray Lasers," Comments in Plasma Physics and Controlled Fusion, Vol. 10, p. 245, (1987)). In a simple incoherent disk source model of an x-ray laser having constant gain and no refraction, (London et al., "Coherent X-ray Lasers for Applications," Lawrence Livermore National Laboratory Report, UCRL-JC-105731, to appear in Proceedings at 2nd International Colloquium on X-Ray Lasers, (1990), eds. G. J. Pert and G. J. Tallents (IOP: Bristol UK)), the relative coherence length is given approximately by 1/F, where F is a parameter of the laser known as the Fresnel number, $F = 2\pi a^2/\lambda L$). Here a is the half-width of the laser, L is its length and $\lambda$ is the wavelength. This explains the design criterion for a long narrow laser, i.e. to make the relative coherence length near one we need F near one. For example, Rosen, Trebes, and Mathews (1987) suggest a laser of 0.0025 cm wide by 3 cm long, operating with a lasant of neon-like selenium ions at 206 Å and 210 Å. Such a narrow configuration is hard to achieve. The implementation suggested by Rosen, Trebes, and Mathews (1987) uses an exploding foil in which the lasant material is surrounded by a different material (ytterbium in this case). Furthermore, the simple theory leading to this design only applies to the particular case when the gain coefficient is constant within the laser and when there is no refraction within the laser. This is not generally the case for x-ray lasers created by exploding foils. Here we expect gradients in both the gain and the electron density (which gives rise to refraction in a plasma).

We have invented another method to achieve good transverse coherence. This invention came from considering the effects of transverse variations in the gain coefficient and in the refractive index (caused by electron density in a plasma), and by considering a detailed model for calculating the expected degree of coherence of a laser, more accurate than the simple incoherent disk model described above. Our technique for creating a coherent x-ray laser utilizes a lasing medium having a specific class of transverse profiles of gain and/or refractive index. These profiles create gain-guiding and/or refractive anti-guiding, respectively, of the x-rays as they travel down the length of the laser and are amplified. The essential features of these profiles are that they be smooth and rounded near the central axis of the laser, and that the gain has a maximum on axis and the index of refraction has a minimum on axis. Either gain-guiding or index anti-guiding or a combination of the two effects can be used to create a coherent x-ray laser. The creation of smooth rounded profiles is a natural consequence of using an exploding foil to create the lasers. That is, the natural state of density of matter in an exploding foil assumes a smooth, rounded (bell-shaped distribution) during the time when x-ray lasing takes place, during the history of an exploding foil (R. A. London et al., "Hydrodynamics of Exploding Foil X-Ray Lasers," Physics of Fluids, Vol. 29, p. 3813, (1986)).

The analysis of the relative coherence length of a rounded-profile x-ray laser, and the derivation of the design parameters for a high coherence laser are described in the paper entitled "Modal Analysis of X-Ray Laser Coherence" by London, Strauss and Rosen appearing in Physical Review Letters, 65, pp. 563–566 (July 30, 1990) which is incorporated herein by reference. We summarize the material in that paper which is relevant to this invention.

The coherence is described by absolute value of the complex degree of coherence, labelled as $|\mu|$. This function describes the degree of correlation between the electric field of the laser radiation at two separate transverse positions. The complex degree of coherence generally drops from a value of one when the two points are very close together to zero as the points are moved further apart. The place where $|\mu|$ drops to $\frac{1}{2}$ is defined as the transverse coherence length, for the purposes of this invention. The ratio of the transverse coherence length to the width of the laser, which we define as the relative coherence length, describes how coherent the total output of the laser is. It is desirable to have a laser in which this ratio is as close to one as possible, in order that the radiation emanating from the laser is a coherent as possible. In practice, we consider ratios of 0.05–0.1 sufficient, 0.1–0.5 good and 0.5–1.0 very good transverse coherence.

The calculation of the complex degree of coherence and the relative coherence length is accomplished by a modal analysis of the electromagnetic wave equation. The paraxial approximation is first made to the wave equation. Then a specific mode expansion is assumed for the electric field which is to be a solution of the wave equation. On substituting this mode expansion into the equation one gets two equations, a transverse eigenvalue-eigenfunction equation, and a longitudinal amplification equation. Given a set of functions which satisfy the transverse mode equation for given transverse profiles of gain and refractive index, which we call modes, the longitudinal equation is solved for the output radiation quantities, such as the intensity of radiation and the complex degree of coherence (intensity and coherence). The output properties (intensity and coherence) are in the form of a double sum over transverse mode products, each term having a transverse factor and a longitudinal (amplification) factor.

This modal analysis has been applied both to a square profile lasers having constant gain coefficient and index of refraction in a finite region, and to smooth profile lasers. In the case of smooth profiles both parabolic functions and functions of the form $\cosh^{-2}(x/a)$, where x is the transverse coordinate direction and a is the approximate width of the laser have been studied. For the case of square profile lasers with no refraction, the results predicted by the simple incoherent disk model discussed above are reproduced by this more exact analysis. That is, the coherence length scales inversely as the Fresnel number. For the case of the smooth rounded profiles (i.e. parabolic and $\cosh^{-2}$ profiles) it is found that good coherence can be achieved by requiring that the output radiation intensity and the complex degree of coherence be dominated by one or a few of the first (low mode) terms in the double sum over the modes. For the cases of very weak refraction and very strong refraction compared to gain, the following scaling laws describe the parameters necessary to achieve a high degree of transverse coherence.

For pure gain guiding, the equation is:

$$a \leq 0.2(g\lambda)^{\frac{1}{2}}L$$

For strong refractive anti-guiding, with refraction due to plasma electrons, the equation is $$a \leq \eta(gL)^2/[\ln(\eta)]^{\frac{1}{2}}$$

in which $$\eta = \frac{N_e}{g} \cdot \frac{2e^2\lambda}{M_e c^2} \approx 6 \times 10^{-13} \frac{\lambda N_e}{g},$$

where e is the electron charge,
where all quantities are in cgs units, and
a = full width half maximum of the laser, i.e., gain and density
L = length of the laser
g = maximum on-axis value of the gain coefficient of laser
λ = wavelength of the laser
$N_c$ = maximum on-axis electron density
e = electron charge (constant)
$M_e$ = electron mass (constant)
C = speed of light (constant)

Figure 2:
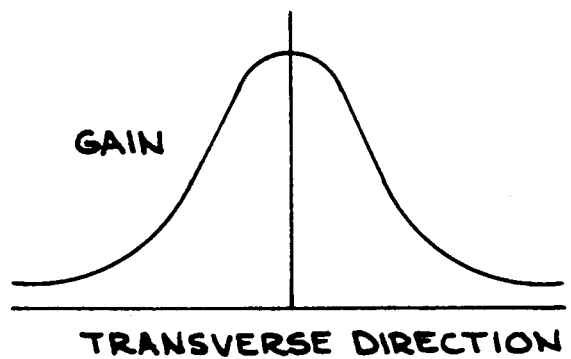
FIG. 2 is a graph of the gain profile of the x-ray laser used in the system of this invention.
Figure 3:
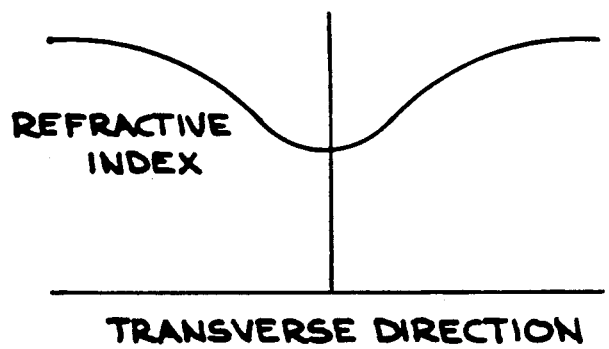
FIG. 3 is a graph of the refractive index profile of the x-ray laser used in the system of this invention.

A schematic diagram of such a laser configuration is shown in FIGS. 1-3. FIG. 1 is a schematic diagram of a laser. FIG. 2 is a graph illustrating the optimum gain profile for the laser, while FIG. 3 is a graph illustrating the optimum refractive index. The mechanism by which such profiles improve the coherence is by reducing the cross-sectional area of the region of the laser in which significant amplification occurs. This results from the fact that gain guiding and the index anti-guiding favor the amplification of radiation which travels straight down the center of the laser. Gain guiding implies that the x-rays which travel down the middle of the laser experience more amplification because that is where the gain is maximum. Other x-ray paths will not experience as much amplification because they do not stay in the region of the maximum (on-axis) gain. Refractive anti-guiding aids this effect since rays traveling straight down the middle of the laser remain in a region of nearly flat refractive index and therefore travel relatively straight. Rays which travel in some other direction bend out of the lasing medium.

One way to make the appropriate transverse profiles is to use an exploding foil plasma x-ray laser. In such a laser, the density of both ions and electrons have their maximum values on the axis and they drop off to either side. They have smooth rounded profiles, which can be described by Gaussian functions (London and Rosen 1986). Since the main determinant of gain is the ion density, the gain can have the desired on-axis peak. The refraction in a plasma is dominated by the effect of the free electrons and decreases with increasing electron density. Thus, the natural electron density profile in an exploding foil x-ray laser has the desired property of a minimum in index of refraction on axis. The particular values of the laser parameters which determine the coherence, such as g, $N_e$, and a and L, can be set by varying the initial width and length of the exploding foil and the intensity and pulse duration of the optical laser beams which energize the foil as described in the paper by London and Rosen (1986).

This invention will be more fully understood with reference to the following examples, which are intended to be illustrative of the invention but not limiting thereof.

EXAMPLE 1

A. 206 Å neon-like selenium exploding foil laser of the type previously described is designed which uses neon-like selenium ions as the lasant. It gives rise to strong lasing at λ=206 Å and λ=210 Å and weaker lasing at other wavelengths. The plasma conditions at the peak lasing time are:
a = $8.5 \times 10^{-3}$ cm
g = 5 cm$^{-1}$
L = 4 cm or larger
$N_e = 3.5 \times 10^{20}$ cm$^{-3}$ The gain is typical of values measured for neon-like selenium for thicker (large a) plasmas. The parameters a and $N_e$ can be achieved by adjusting the initial thickness of the foil, the irradiating optical laser intensity and the duration at the irradiating laser pulse.

The appropriate initial conditions to create the conditions for this laser may be estimated by using the model for the hydrodynamics of exploding foil x-ray lases described in the paper by London and Rosen (1986). Using this method, an approximate set of parameters have been determined. The foil consists of selenium on a plastic backing (e.g. Formvar or Lexan). The selenium has an area density of approximately 15 μg/cm$^2$, corresponding to a thickness of about 312 Å at density 4.8 gm/cm$^3$. The plastic has an areal mass density of approximately 5 μg/cm$^2$, corresponding to a thickness of approximately 500 Å at density 1 gm/cm$^3$. The foil is approximately 0.02 cm wide (or wider) by 4 cm long. The foil is irradiated by two opposing beams of 0.53 μm laser light. Each beam has a 200 psec (FWHM) duration and an energy of 250 J. The beams are focused to an area on the target approximately 0.01 cm by 4 cm in size.

EXAMPLE 2

A. 45 Å nickel-like tantalum laser is designed so that the parameters are:
λ = $4.5 \times 10^{-7}$ cm
a = $3.5 \times 10^{-3}$ cm
g = 4.2 cm$^{-1}$
L = 3 cm or larger
$N_e = 10^{21}$ cm$^{-1}$ A gain of 3 cm$^{-1}$ has been measured for nickel-like tantalum. Somewhat higher gain (i.e. near 4.2 cm$^{-1}$) can be achieved by varying the target thickness, the irradiating laser intensity and the duration at the irradiating pulse.

The appropriate initial conditions to create the conditions for this laser are estimated by using the model for the hydrodynamics of exploding foil x-ray lasers described in the paper by London and Rosen (1986). The foil consists of tantalum on a plastic backing (e.g. Formvar or Lexan). The tantalum has an area density of approximately 20 μg/cm$^2$, corresponding to a thickness of about 120 Å at density 17 g/cm$^3$. The plastic has an areal mass density of approximately 5 μg/cm$^2$, corresponding to a thickness of approximately 500 Å at density 1 gm/cm$^3$. The foil is approximately 0.02 cm wide (or wider) by 4 cm long. The foil is irradiated by two opposing beams of 0.53 μm laser light. Each beam has a 100 psec (FWHM) duration and an energy of 1250 J. The beams are focused to an area on the target approximately 0.01 cm by 4 cm in size.

In the preferred embodiment of the invention the ratio of coherence length to width can range from about 0.05 to 1, preferably from about 0.1 to 1, more preferably from about 0.5 to 1.

While specific embodiments of the invention have been illustrated, modifications and changes of the apparatus, parameters, etc. will become apparent to those skilled in the art, and it is intended to cover in the appended claims all such modifications and changes which come within the scope of the invention.

We claim:

1. An x-ray laser system comprising an x-ray laser capable of emitting radiation in the range of 10 eV to 10 KeV, such that the emitted radiation is in the x-ray range of the electromagnetic spectrum, and whose emitted radiation has a ratio of transverse coherence length to the width of said laser in identical units of measure ranging from about 0.05 to 1.

2. An x-ray laser system comprising a source of x-ray radiation and means for energizing said source, wherein emitted radiation from said source has a ratio of transverse coherence length to the width of said source in identical units of measure ranging from about 0.05 to 1.

3. An x-ray laser system comprising:
   a. a laser having a transverse gain profile in which the gain has a given on-axis value containing generating means for emitting short wave length coherent radiation, and
   b. means external to said laser for energizing said generating means, wherein when emitting radiation, the ratio of the transverse coherence length of said radiation to the width of said laser in identical units of measure, ranges from about 0.05 to 1.

4. The system of claim 3, wherein said generating means is an exploding thin foil, heated to a temperature sufficient to excite electrons in the atoms thereof and thereby emit short wavelength radiation.

5. The system of claim 3, wherein said means for energizing said generating means is a pulsed neodymium-glass laser.

6. The system of claim 3, wherein the transverse gain profile of the radiation emitted from said generating means has a parabolic configuration.

7. The system of claim 6, wherein the physical parameters of said laser are determined in accordance with the formula:

$$a \leq 0.2 (g \lambda)^{\frac{1}{2}} L$$

wherein all values are in cgs units, and a is equivalent to the full width half maximum width of said laser, L is the length of said laser, g is equivalent to the on-axis value of the gain coefficient of said laser, and λ is the wavelength of said laser.

8. An x-ray laser system comprising:
   a. an exploding foil laser capable of emitting radiation in the x-ray range, and
   b. means external to said exploding foil laser for energizing it comprising:
      a pulsed neodymium-glass laser,
      wherein, the radiation emitted from said exploding foil laser, when heated to a temperature sufficiently high to emit radiation in the x-ray range, has a ratio of transverse coherence length to width of said laser in identical units of measure ranging from about 0.05 to 1.

9. An x-ray laser system comprising:
   a. a laser capable of emitting radiation in the range of 10 eV to 10 KeV, such that the emitted radiation is in x-ray range of the electromagnetic spectrum.
   b. means external to said laser for energizing said laser to cause emission of radiation therefrom, wherein when energized said radiation emitted therefrom has a ratio of transverse coherence length to width of said laser in identical units of measure ranging from about 0.05 to 1.

10. A method of improving the transverse coherence of radiation being emitted from an x-ray laser having a transverse gain profile in which the gain has a given on-axis value which comprises: adjusting at least one of the length, width or gain for a given wavelength of said laser so as to conform to the formula $$a \leq 0.2 (g \lambda)^{\frac{1}{2}} L$$

wherein all values are in cgs units, and a is equivalent to the full width half maximum width of said laser, L is the length of said laser, g is equivalent to the maximum on-axis value of the gain coefficient of said laser, and λ is the wavelength of said laser.

11. A method of improving the transverse coherence of radiation being emitted from an x-ray laser having a transverse gain profile in which the gain has a given on-axis value which comprises: adjusting the physical design parameters of said laser including at least one of the length, width, gain or electron density for a given wavelength so as to conform to the formula:

$$a \leq \eta (gL)^2 / [\ln(4\eta)]^{\frac{1}{2}}$$

in which $$\eta = \frac{N_e}{g} \frac{2e^2 \lambda}{M_e C^2} = 6 \times 10^{-13} \frac{\lambda N_e}{g}$$

where all values are in cgs units, and a is equal to the full width half maximum of said laser, L is the length of said laser, g is the maximum width on axis value of the gain coefficient of said laser, λ is the wavelength of said laser, $N_e$ is the maximum on-axis electron density, e is the electron charge, $M_e$ is the electron mass and C is the speed of light.

12. The method of claim 10, wherein said laser is an exploding foil laser.

13. The method of claim 12, wherein the foil of said exploding foil laser is tantalum.

14. The method of claim 12, wherein the foil of said exploding foil laser is selenium.

15. The method of claim 11, wherein said laser is an exploding foil laser.

16. The method of claim 15, wherein the foil of said exploding foil laser is tantalum.

17. The method of claim 15, wherein the foil of said exploding foil laser is selenium.

* * * * *